(12) United States Patent
Sato et al.

(10) Patent No.: US 8,448,950 B2
(45) Date of Patent: May 28, 2013

(54) SPLIT MECHANICAL SEAL

(75) Inventors: Tetsuya Sato, Tokyo (JP); Hirofumi Okubo, Tokyo (JP)

(73) Assignee: Eagle Industry Co., Ltd. (JP)

( * ) Notice: Subject to any disclaimer, the term of this patent is extended or adjusted under 35 U.S.C. 154(b) by 548 days.

(21) Appl. No.: 12/741,185

(22) PCT Filed: Apr. 20, 2009

(86) PCT No.: PCT/JP2009/057834
§ 371 (c)(1),
(2), (4) Date: May 3, 2010

(87) PCT Pub. No.: WO2009/136539
PCT Pub. Date: Nov. 12, 2009

(65) Prior Publication Data
US 2010/0264597 A1    Oct. 21, 2010

(30) Foreign Application Priority Data

May 9, 2008    (JP) ................................ 2008-122957

(51) Int. Cl.
*F16J 15/34*    (2006.01)
(52) U.S. Cl.
USPC .......................................... 277/358; 277/372
(58) Field of Classification Search
USPC .......................................... 277/358, 372, 373
See application file for complete search history.

(56) References Cited

U.S. PATENT DOCUMENTS

| | | | | |
|---|---|---|---|---|
| 2,645,507 A | * | 7/1953 | Isenbarger | 277/374 |
| 2,912,265 A | * | 11/1959 | Brummer | 277/363 |
| 3,529,838 A | * | 9/1970 | Singleton | 277/388 |
| 3,578,344 A | * | 5/1971 | Yost | 277/373 |
| 4,576,384 A | | 3/1986 | Azibert | 277/81 |
| 5,556,110 A | * | 9/1996 | Marsi et al. | 277/397 |
| 5,615,893 A | | 4/1997 | Reagan | 277/81 |
| 5,961,122 A | | 10/1999 | Marsi | 277/306 |
| 6,550,779 B2 | * | 4/2003 | Bjornson | 277/370 |
| 6,561,515 B1 | * | 5/2003 | Bjornson | 277/358 |
| 6,962,340 B2 | | 11/2005 | Maruyama | 277/370 |
| 7,413,615 B2 | | 8/2008 | Yada et al. | 134/10 |
| 2005/0087931 A1 | | 4/2005 | Yamauchi et al. | 277/358 |

FOREIGN PATENT DOCUMENTS

| | | |
|---|---|---|
| CN | 85109414 | 8/1986 |
| CN | 1453488 | 11/2003 |
| CN | 1585867 | 2/2005 |
| CN | 101067453 | 11/2007 |
| JP | 8-54067 | 2/1996 |
| JP | 2005-127436 | 5/2005 |
| JP | 2006-291988 | 10/2006 |

OTHER PUBLICATIONS

International Search Report, PCT/JP2009/057834, dated Jul. 21, 2009, (3 pgs).
International Preliminary Report on Patentability issued in corresponding PCT/JP2009/057834, dated Dec. 23, 2010 (5 pgs).
Chinese Office Action (w/English translation) issued in corresponding application No. 2009801024477, dated Nov. 5, 2012 (7 pgs).

* cited by examiner

*Primary Examiner* — Gilbert Lee
(74) *Attorney, Agent, or Firm* — Hayes Soloway P.C.

(57) ABSTRACT

A split mechanical seal has split ring fitting holes into which split rings having a rectangular cross-section are fitted. The split ring fitting holes are formed over the entire length in the circumferential direction of the seal between split sealing rings and split flanges. The split rings are mounted in the split ring fitting holes with the phases of the split sealing rings and the split flanges shifted from each other such that one end of each split ring projects from a split contact surface.

20 Claims, 14 Drawing Sheets

Fig. 10
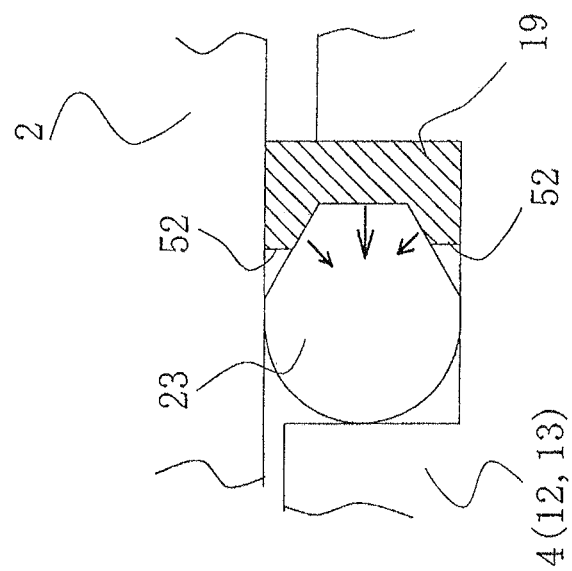
Fig. 10a
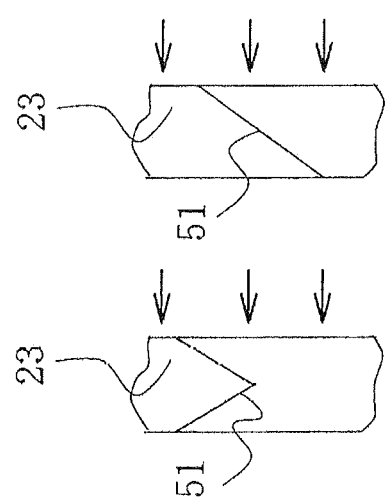
Fig. 10b

Fig. 11
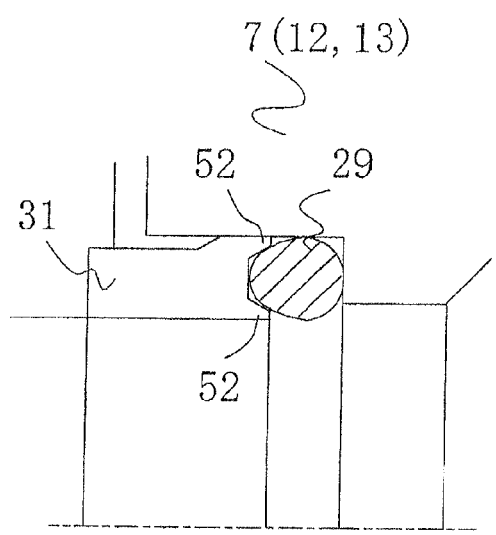
Fig. 11a
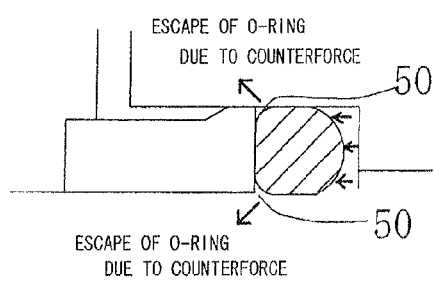
Fig. 11b

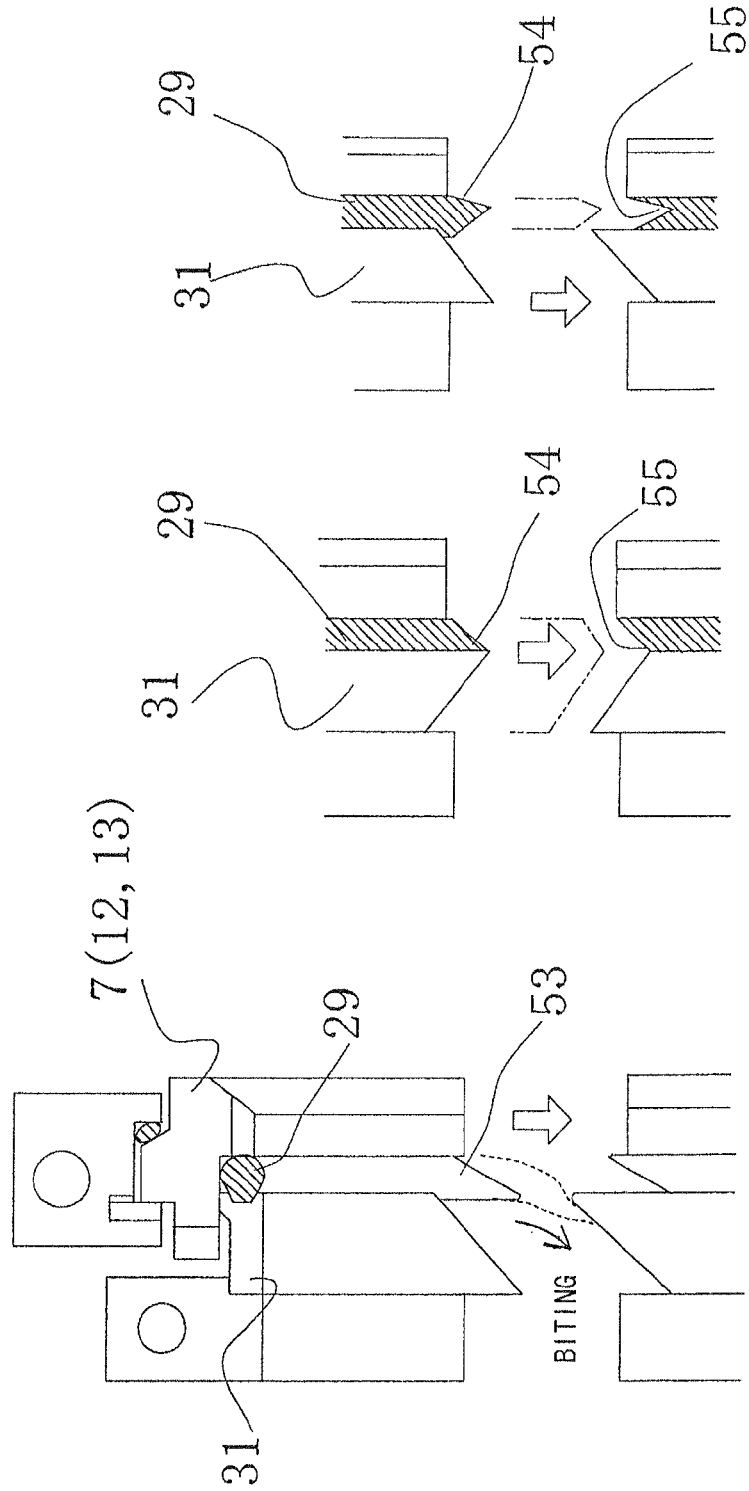

Prior Art

Prior Art

SPLIT MECHANICAL SEAL

TECHNICAL FIELD

The present invention relates to a mechanical seal used in pumps, agitators, compressors, and various other rotary mechanical implements, the mechanical seal being configured to form a seal at sealing end surfaces that are the opposing end surfaces of a static seal ring and a rotating seal ring, and particularly relates to a split mechanical seal in which the static seal ring or the rotating seal ring is split along the circumferential direction thereof.

BACKGROUND ART

FIG. 13 shows an example of a known completely-split mechanical seal in which a static seal ring and a rotating seal ring are split along the circumferential direction thereof in a mechanical seal (see Patent Document 1, for example; hereinafter referred to as Prior Art 1).

FIG. 14 shows a known partial split mechanical seal in which a static seal ring is bound and retained in an annular state by the elastic force of a binding body composed of an elastic material charged between the opposing peripheral surfaces of a retainer and the static seal ring in a split mechanical seal, in which a static seal ring on the side of a seal case is split in the peripheral direction thereof and fitted into and held by a retainer in an annular state in which the divided faces thereof abut each other, and a shielding seal is formed between a sealed fluid region and a non-sealed fluid region by the relative rotational sliding of the sealing end surfaces that are the opposing end surfaces of the static seal ring and a rotating seal ring on a rotary shaft side, the sealed fluid region being the region on the internal peripheral side of a relatively rotating and sliding portion, and the non-sealed fluid region being the region on the external peripheral side of the relatively rotating and sliding portion (see Patent Document 2, for example; hereinafter referred to as Prior Art 2).

The completely split mechanical seal of Prior Art 1 shown in FIG. 13 comprises a seat ring 75 integrally fastened to an overhanging end surface of a fixed casing 70; a seal ring 77 loosely fitted on a rotary shaft 71 inserted through the fixed casing 70, so that a sliding seal surface S is formed against the adjacent seat ring 75; a shaft packing 87 enclosed in a gap formed between the internal peripheral surface of the seal ring 77 and the external peripheral surface of the rotary shaft 71; a seal ring holder 78 for embracing the external peripheral surface of the seal ring 77; a holder band 79 for further embracing the external peripheral surface of the holder 78; a retainer ring 80 integrally fastened to the seal ring holder 78 so as to confine the back end surface of the seal ring 77; a drive ring 82 integrally fitted on the rotary shaft 71, and integrally coupled to the retainer ring 80 via a drive pin 84; and a compression coil spring 85 inserted between mutually adjacent surfaces of the drive ring 82 and the retainer ring 80 so as to impart a back pressure to the seal ring 77. The shaft packing 87 and the holder band 79 both form a C-shape in which expansion deformation is possible, whereas the seat ring 75, seal ring 77, seal ring holder 78, retainer ring 80, and drive ring 82 are divided into two sections entirely facing each other, and are integrally fastened so as to be detachable at the divided faces thereof, and the divided face of at least the seal ring 77 and the divided face of the seal ring holder 78 differ in phase from each other by an arbitrary intersection angle. In this completely split mechanical seal, seat ring segments of the seat ring 75 that is divided into two sections are integrally fastened in an overall circular ring shape by a bolt 89 and a tapered-pin-type centering wedge 92 inserted at the divided face; and retainer ring segments of the retainer ring 80 that is divided into two sections are integrally fastened in an overall circular ring shape by a bolt 123 and a tapered-pin-type centering wedge 126 inserted at the divided face.

In the partial split mechanical seal according to Prior Art 2 shown in FIG. 14, a static seal ring 69 divided in the peripheral direction thereof is bound and retained in an annular state with the divided faces thereof abutting each other by the elastic force of a binding body 88 composed of an elastic material charged between the external peripheral surface 69c of the static seal ring 69 and the internal peripheral surfaces 85a, 85b of a retainer 7 composed of a cylindrical first retainer member 84 retained by a seal case for fittingly retaining the static seal ring 69, and a cylindrical second retainer member 85 for fittingly retaining the seal ring 69, the second retainer member 85 being attached so as to be fastenable to the first retainer member 84 in the axial direction. The binding body 88 is composed of rubber, synthetic resin, or another incompressible elastic material.

PRIOR ART REFERENCES

Patent Documents

Patent Document 1: Japanese Laid-open Patent Publication No. H08-054067

Patent Document 2: Japanese Laid-open Patent Publication No. 2006-291988

DISCLOSURE OF THE INVENTION

Problems to be Solved by the Invention

In the completely split mechanical seal according to Prior Art 1, seat ring segments of the seat ring 75 corresponding to the static seal ring that is divided into two sections are integrally fastened in an overall circular ring shape by a bolt 89 and a tapered-pin-type centering wedge 92 inserted at the divided face; and retainer ring segments of the retainer ring 80 corresponding to the rotating seal ring that is divided into two sections are integrally fastened in an overall circular ring shape by a bolt 123 and a tapered-pin-type centering wedge 126 inserted at the divided face. Described below are drawbacks of the completely split mechanical seal according to Prior Art 1.

(1) Since the technique of Prior Art 1 is not designed so as to enable temporary fitting of each component on-site and simplify the work of assembly at a site, temporary fitting of the components is not possible, the on-site production cost is increased, and a long time is needed for assembly.

(2) Since the precision of assembly is maintained using tapered-pin-type centering wedges, the holes in both members of the divided seat ring segments or the divided retainer ring segments must be formed simultaneously with a high degree of precision, and time is required to form the holes. In the case of tapered-pin-type centering wedges, a large amount of effort is required during disassembly, due to the large area of the contacting surfaces, the counterforce of the cushioning members, and other factors, and disassembly is difficult.

(3) The tapered-pin-type centering wedge ensures the assembly precision of the retainer ring for supporting the rotating seal ring, but does not directly ensure the precision of the rotating seal ring, and the rotating seal ring is therefore difficult to position.

The partial split mechanical seal according to Prior Art 2 has a structure in which a static seal ring 69 divided in the peripheral direction thereof is bound and retained in an annular state with the divided faces thereof abutting each other by the elastic force of a binding body 88 composed of rubber and a synthetic resin material charged between the static seal ring 69 and the internal peripheral surfaces 85a, 85b of a retainer 7 composed of a cylindrical first retainer member 84, and a cylindrical second retainer member 85 for fittingly retaining the seal ring 69, the second retainer member 85 being attached so as to be fastenable to the first retainer member 84 in the axial direction. The technique of Prior Art 2 therefore has the drawbacks described below.

(1) The tightening margin of the binding body composed of an elastic material must be increased in order to ensure the internal pressure resistance of the seal ring, and deformation of the seal ring increases.

(2) When the elastic binding body is composed of a synthetic resin material, temporary fixing is difficult, and workability is reduced.

(3) When the elastic binding body is composed of rubber or synthetic resin material, the binding body is subject to permanent set in fatigue over time, and stable performance is therefore difficult to maintain over long periods.

(4) When the binding body composed of an elastic material is an O-ring, resistance is high at the contacting portions thereof, and workability during assembly and disassembly is extremely poor.

An O-ring divided into two sections along the peripheral direction thereof has conventionally been bonded to the split contact surfaces and used to form a seal between the static seal ring or rotating seal ring and the retainer or the like for supporting the static seal ring and rotating seal ring, but this configuration has such drawbacks as those described below.

(1) When the precision of the bond is low, a gap forms between the seal ring and the retainer or the like, and a leakage path is formed, leading to significant leakage.

(2) When too little adhesive is applied, the sectional faces cannot be reliably sealed, and a leakage path is formed.

(3) When there is adhesive overflow, the seal ring and the retainer or the like become stuck, and operation is severely impeded. When a misalignment occurs from the proper attachment position, damage can be caused by correcting the position after bonding.

(4) Depending on the fluid being handled, the adhesive may dissolve, thereby reducing the initial adhesive effect and leading to leakage.

A backup ring may also be used instead of an adhesive, but this configuration also has drawbacks, as described below.

(1) When the split contact surfaces of the O-ring are placed together on the shaft at the site, the distal end of the O-ring catches on the backup ring or the like for supporting the seal ring or O-ring, and a gap is formed, which leads to leakage due to the inability to ensure an adequate seal.

An object of the present invention is to provide a split mechanical seal (a mechanical seal composed of a split seal ring, a split flange, and other components that is split in a temporarily fitted state prior to assembly being referred to as a "split mechanical seal"; the same hereinafter) split along the peripheral direction of the seal, wherein the precision of assembling the mechanical seal and the precision of assembly at each split contact surface are enhanced, assembling workability in a site is enhanced by providing a guide function to the split mechanical seal, and assembling workability in a site is markedly enhanced by providing a temporary fitting function to the split mechanical seal, and leakage is eliminated.

Problems to be Solved by the Invention

The split mechanical seal according to a first aspect of the present invention for achieving the abovementioned objects is a split mechanical seal comprising split seal rings in which a static seal ring provided on the side of a housing, or a rotating seal ring provided to a rotary shaft inserted through a housing, is split along the circumferential direction; and split flanges in which split contact surfaces of the split seal rings are placed together, the split flanges being fitted on external peripheral surfaces of the split seal rings; the split mechanical seal being configured so that a seal is formed by seal end surfaces that are the opposing end surfaces of the static seal ring and the rotating seal ring; and the split mechanical seal is characterized in that split ring fitting holes into which split rings having a rectangular cross-section are fitted are formed along the entire length in the circumferential direction between the split seal rings and the split flanges; the split rings rectangular in cross-section are provided in the split ring fitting holes with the phases of the split seal rings and the split flanges shifted from each other in the circumferential direction such that one end of each split ring protrudes from the split contact surface; and protruding portions of the split seal rings fit into corresponding split ring fitting holes when the split seal rings and the split flanges are placed together at the split contact surfaces.

The split mechanical seal according to a second aspect of the present invention is the split mechanical seal according to the first aspect, characterized in that the split contact surfaces of the split seal rings are natural fracture surfaces.

The split mechanical seal according to a third aspect of the present invention is the split mechanical seal according to the first or second aspect, characterized in that the protruding portions of the split rings are tapered.

The split mechanical seal according to a fourth aspect of the present invention is the split mechanical seal according to any of the first through third aspects, characterized in that the cross-sectional shape of the external peripheral sides of the split seal rings is such that the central portion of the cross-sectional shape in the width direction is high, one side thereof has a perpendicular step portion, the other side has an inclined step portion forming an obtuse angle, and both sides have a low profile; the cross-sectional shape of the internal peripheral sides of the split flanges that face the external peripheral sides of the split seal rings substantially corresponds to the cross-sectional shape of the external peripheral sides of the split seal rings; a groove rectangular in cross-section is formed in a position corresponding to the perpendicular step portion of each split seal ring on the internal peripheral side of the split flanges; and the split ring fitting holes are formed by the perpendicular step portion of each split seal ring and the groove of each split flange.

In the first aspect described above, split ring fitting holes into which split rings having a rectangular cross-section are fitted are formed along the entire length in the circumferential direction between the split seal rings and the split flanges; and the split rings rectangular in cross-section are provided in the split ring fitting holes with the phases of the split seal rings and the split flanges shifted from each other in the circumferential direction such that one end of each split ring protrudes from the split contact surface. The workability of assembling two split mechanical seals (a mechanical seal composed of split seal rings, split flanges, and other components that is split in a temporarily fitted state prior to assembly being referred to as a "split mechanical seal"; the same terminology being used hereinafter) can thereby be enhanced by the guide function of the split rings.

In the second aspect described above, since the split contact surfaces of the split seal rings are natural fracture surfaces, the split joining surfaces of the two split mechanical seals can easily be endowed with high precision, particularly in the radial direction, during assembly at a site.

Furthermore, in the third aspect described above, since the protruding portions of the split rings are tapered, the protruding portions can easily fit into the corresponding fitting holes even when the split joining surfaces of the two split mechanical seals are somewhat misaligned during assembly at a site, and the workability of assembly at a site can be markedly enhanced.

The split mechanical seal according to a fifth aspect of the present invention is the split mechanical seal according to any of the first through fourth aspects, characterized in that a cushioning member is provided between the internal peripheral side of each split flange and the obtusely angled inclined step portion on the external peripheral side of each split seal ring.

Since the split seal rings, the split rings, and the split flanges are thereby placed together in a state of being pushed together in the axial direction by the elastic counterforce of the cushioning member during temporary fitting, the precision of the split seal rings and split flanges in the axial direction can be enhanced, and a function can be provided for maintaining the temporarily fitted state.

The split mechanical seal according to a sixth aspect of the present invention is the split mechanical seal according to any of the first through fifth aspects, characterized in that the precision of positioning in the axial direction is enhanced by joining one side surface of each split ring with the perpendicular step portion of each split seal ring, and joining the other side of the split ring with an inside surface of the groove of each split flange. The precision of positioning in the axial direction in particular can thereby be enhanced.

The split mechanical seal according to a seventh aspect of the present invention is the split mechanical seal according to any of the first through sixth aspects, characterized in that a plurality of screw holes for screwing drive pins that are screwed in from drive pin fitting holes of each split flange is provided to one side surface of each split ring; and a plurality of knock pins for fitting in or drive pins for screwing into the perpendicular step portion of each split seal ring is loaded on the other side surface of each split ring.

The split mechanical seal can therefore be endowed with high precision in the radial direction of each component thereof, a temporary fitting function can be provided to the split mechanical seal as such, and the split mechanical seal can be transported to a site in a temporarily fitted state.

The split mechanical seal according to an eighth aspect of the present invention is the split mechanical seal according to any of the first through seventh aspects, characterized in that a split tolerance ring is provided between the external peripheral surface of each split seal ring and the internal peripheral surface of each split flange.

The split seal rings are urged in the radial direction by the elastic force of the split tolerance ring with respect to the internal peripheral surface of the split flanges, and can thereby be temporarily fixed in place stably during shipping and handling. The internal pressure resistance of the split seal rings can also be effectively set, and it is possible to prevent deformation of the split seal rings by excessive tightening.

The split mechanical seal according to a ninth aspect of the present invention is the split mechanical seal according to any of the first through seventh aspects, characterized in that screw holes oriented toward the external peripheral surface of each split seal ring are provided in a plurality of locations in the circumferential direction of each split flange; and set screws are screwed into the screw holes.

During assembly at a site after temporary fitting and transport, the internal pressure resistance to the fluid pressure acting on the split seal rings can be set by tightening the set screws at a controlled torque, and adjustments to changes over time can also be made by retorquing.

The split mechanical seal according to a tenth aspect of the present invention is the split mechanical seal according to any of the first through ninth aspects, characterized in that the cross-sectional shape of a split backup ring for backing up a split O-ring loaded on the external peripheral surface of each split seal ring on the static side to form a seal against a seal case, or a split O-ring loaded on the internal peripheral surface of each split seal ring on the rotating side to form a seal against the external peripheral surface of the rotary shaft is formed having lip portions on the inside and outside radial sides adjacent to the split O-ring, so as to cover the split O-ring.

The cut surfaces of the split O-ring are therefore pressed from three directions, and leakage from the cut surfaces can be prevented. The ratio to which the O-ring fills the gap between the sliding portions can also be increased to prevent leakage. Furthermore, during temporary fitting, the lip portions of the split backup rings also encroach into the gaps between the split seal rings and the split O-rings, thereby enabling the members to catch on each other and be fixed in place, creating the temporary fitting function.

Furthermore, since the split O-ring loaded on the internal peripheral side of the rotating seal ring to form a seal against the side of the rotary shaft can be designed with a small tightening margin in the circumferential direction, it is possible to prevent a gap from being formed by escape of the tightening margin portion of the split O-ring when the split mechanical seal is joined in assembly with the rotary shaft at a site.

The split mechanical seal according to an eleventh aspect of the present invention is the split mechanical seal according to any of the first through tenth aspects, characterized in that the split contact surfaces of the split O-ring loaded on the external peripheral surface of each split seal ring on the static side to form a seal against a seal case, or a split O-ring loaded on the internal peripheral surface of each split seal ring on the rotating side to form a seal against the external peripheral surface of the rotary shaft, and the split backup ring for backing up the split O-ring are formed so that one of the split contact surfaces forms a protruding convex portion, and the other split contact surface forms a concave portion into which the convex portion fits, or one of the split contact surfaces of the split O-ring forms a protruding convex portion, and the other split contact surface forms a concave portion into which the convex portion fits.

Therefore, when the split mechanical seal is joined in assembly with the rotary shaft at a site, the split O-ring can be prevented from being bitten between other members, leakage can be prevented, and the workability of assembly at a site can be enhanced.

Effect of the Invention

The present invention has such advantageous effects as those described below.

(1) Split ring fitting holes into which split rings having a rectangular cross-section are fitted are formed along the entire length in the circumferential direction between the split seal rings and the split flanges; and the split rings rectangular in cross-section are provided in the split ring fitting holes with the phases of the split seal rings and the split flanges shifted from each other in the circumferential direction such that one end of each split ring protrudes from the split contact surface. The workability of assembling two split mechanical seals can thereby be enhanced by the guide function of the split rings.

(2) Since the split contact surfaces of the split seal rings are natural fracture surfaces, the split joining surfaces of the two split mechanical seals can easily be endowed with high precision, particularly in the radial direction, during assembly at a site.

(3) Since the protruding portions of the split rings are tapered, the protruding portions can easily fit into the corresponding fitting holes even when the split joining surfaces of the two split mechanical seals are somewhat misaligned during assembly at a site, and the workability of assembly at a site can be markedly enhanced.

(4) A cushioning member is provided between the internal peripheral side of each split flange and the obtusely angled inclined step portion on the external peripheral side of each split seal ring, and the split seal rings, the split rings, and the split flanges are thereby placed together in a state of being pushed together in the axial direction. The precision of the split seal rings and split flanges in the axial direction can therefore be enhanced, and a function can be provided for maintaining the temporarily fitted state. In particular, the precision of positioning in the axial direction is enhanced by joining one side surface of each split ring with the perpendicular step portion of each split seal ring, and joining the other side of the split ring with an inside surface of the groove of each split flange.

(5) A plurality of screw holes for screwing drive pins that are screwed in from drive pin fitting holes of each split flange is provided to one side surface of each split ring; and a plurality of knock pins for fitting in or drive pins for screwing into the perpendicular step portion of each split seal ring is loaded on the other side surface of each split ring. The split mechanical seal can thereby be endowed with high precision in the radial direction of each component thereof, a temporary fitting function can be provided to the split mechanical seal as such, and the split mechanical seal can be transported to a site in a temporarily fitted state.

(6) The split seal rings are urged in the radial direction by the elastic force of the split tolerance ring with respect to the internal peripheral surface of the split flanges, and can thereby be temporarily fixed in place stably during shipping and handling. The internal pressure resistance of the split seal rings can also be effectively set, and it is possible to prevent deformation of the split seal rings by excessive tightening.

Screw holes oriented toward the external peripheral surface of each split seal ring are provided in a plurality of locations in the circumferential direction of each split flange, and set screws are screwed into the screw holes. Through this configuration, during assembly at a site after temporary fitting and transport, the internal pressure resistance to the fluid pressure acting on the split seal rings can be set by tightening the set screws at a controlled torque, and adjustments to changes over time can also be made by retorquing.

(7) The cross-sectional shape of a split backup ring for backing up a split O-ring is formed having lip portions on the inside and outside radial sides adjacent to the split O-ring, so as to cover the split O-ring. The cut surfaces of the split O-ring are thereby pressed from three directions, and leakage from the cut surfaces can be prevented. The ratio to which the O-ring fills the gap between the sliding portions can also be increased to prevent leakage. Furthermore, during temporary fitting, the lip portions of the split backup rings also encroach into the gaps between the split seal rings and the split O-rings, thereby enabling the members to catch on each other and be fixed in place, creating the temporary fitting function.

Furthermore, since the split O-ring loaded on the internal peripheral side of the rotating seal ring to form a seal against the side of the rotary shaft can be designed with a small tightening margin in the circumferential direction, it is possible to prevent a gap from being formed by escape of the tightening margin portion of the split O-ring when the split mechanical seal is joined in assembly with the rotary shaft at a site.

(8) One of the split contact surfaces formed by the split O-ring and the split backup ring for backing up the split O-ring forms a protruding convex portion, and the other split contact surface forms a concave portion into which the convex portion fits, or one of the split contact surfaces of the split O-ring forms a protruding convex portion, and the other split contact surface forms a concave portion into which the convex portion fits. Through this configuration, when the split flanges and the split seal rings on the rotating side are joined in assembly with the rotary shaft, the split O-ring can be prevented from being bitten between other members, leakage can be prevented, and the workability of assembly at a site can be enhanced.

BRIEF DESCRIPTION OF THE DRAWINGS

FIG. 10 is a view showing the state in which the split O-ring is loaded on the external peripheral surface of the split seal ring on the static side;

FIG. 11 is a view showing the state in which the split O-ring is loaded on the internal peripheral surface of the split seal ring on the rotating side;

FIG. 12 is a view showing the cut shape of the split contact surface formed by the split backup ring and the split O-ring that is loaded on the internal peripheral surface of the split seal ring on the rotating side;

Figure 1:
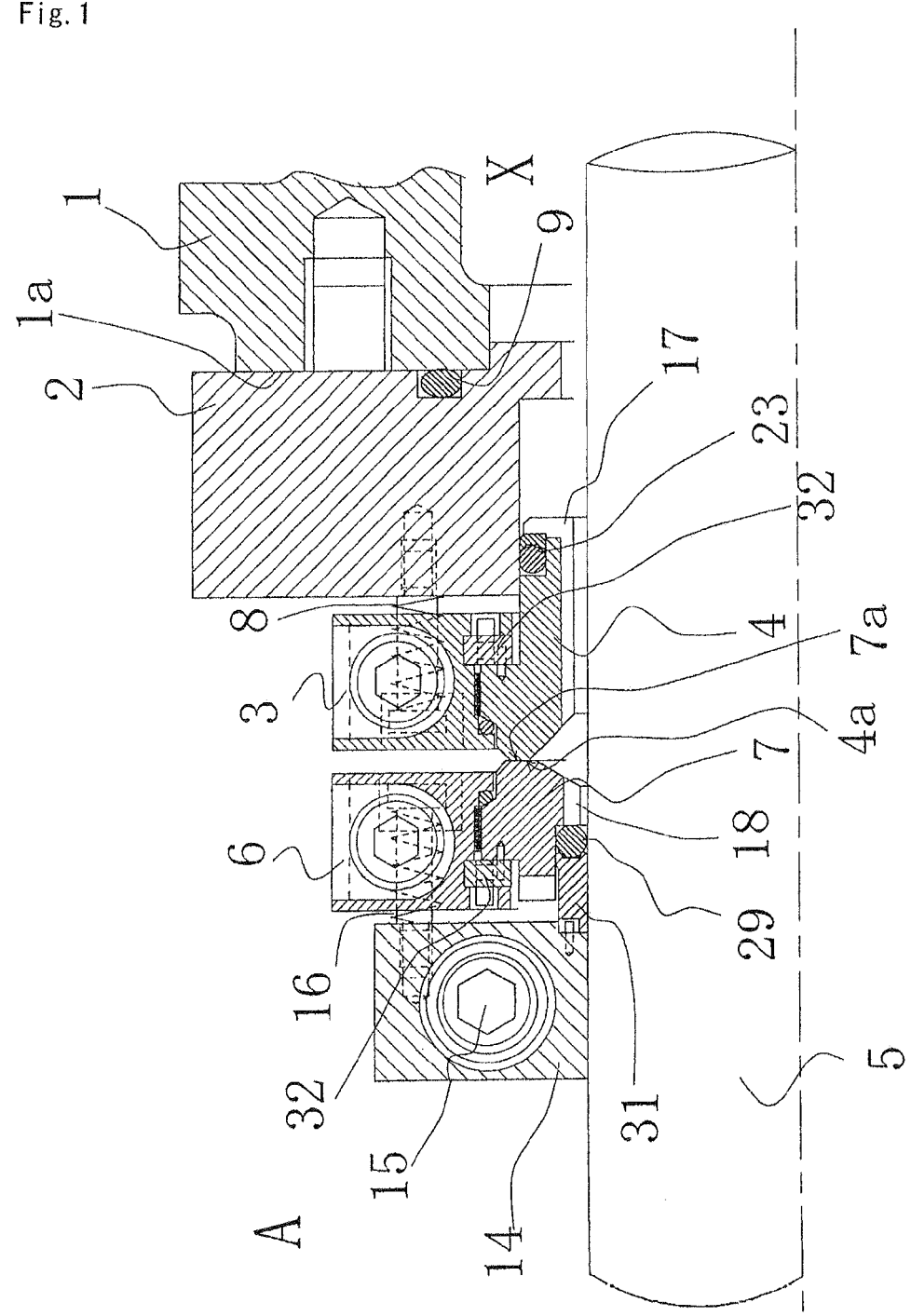
FIG. 1 is a sectional front view showing the entire split mechanical seal according to the present embodiment.

KEY TO SYMBOLS 1 housing
2 seal case
3 split flange
4 static seal ring
5 rotary shaft
6 split flange
7 rotating seal ring
8 spring
9 O-ring
12 split seal ring
13 split seal ring
14 retaining ring
15 fastening bolt
16 spring
17 cutout groove
18 cutout groove
19 split backup ring
20 central portion in the width direction of the split seal ring
21 perpendicular step portion of the split seal ring
22 inclined step portion of the split seal ring
23 split O-ring
24 split flange
25 split flange
26 fastening bolt
27 rectangular groove of the split flange
28 split ring fitting hole
29 split O-ring
30 groove
31 split backup ring
32 split ring
33 protruding portion at the distal ends of the split ring
34 rear end portion of the split ring
35 internal peripheral side of the protruding portion at the distal end of the split ring
36 cushioning member
37 right-side surface of the split ring
38 left-side surface of the split ring
39 right-side surface of the groove of the split flange
40 drive pin
41 screw hole
42 right-side surface of the split flange
43 hole into which a drive pin is fitted
44 knock pin
45 knock pin fitting hole
46 split tolerance ring
47 set screw
48 screw hole
49 drive pin
50 gap
51 split face of O-ring
52 lip portion
53 distal end of the cut portion of the O-ring
54 convex portion
55 concave portion

BEST MODE FOR CARRYING OUT THE INVENTION

Embodiments of the split mechanical seal of the present invention will be described in detail with reference to the accompanying drawings, but these embodiments are not to be construed as limiting the present invention, and various changes, modifications, and improvements based on the knowledge of those skilled in the art are possible within the intention and scope of the present invention.

In the best mode for carrying out the split mechanical seal of the present invention as described hereinafter, a completely split mechanical seal in which both of a static seal ring provided on a housing side, and a rotating seal ring provided to a rotary shaft inserted through the inside of the housing are split will be described as an example, but the present invention is not limited by this example, and the present invention also encompasses a split mechanical seal in which at least one of a static seal ring provided on a housing side, and a rotating seal ring provided to a rotary shaft inserted through the inside of a housing is split.

Figure 2:
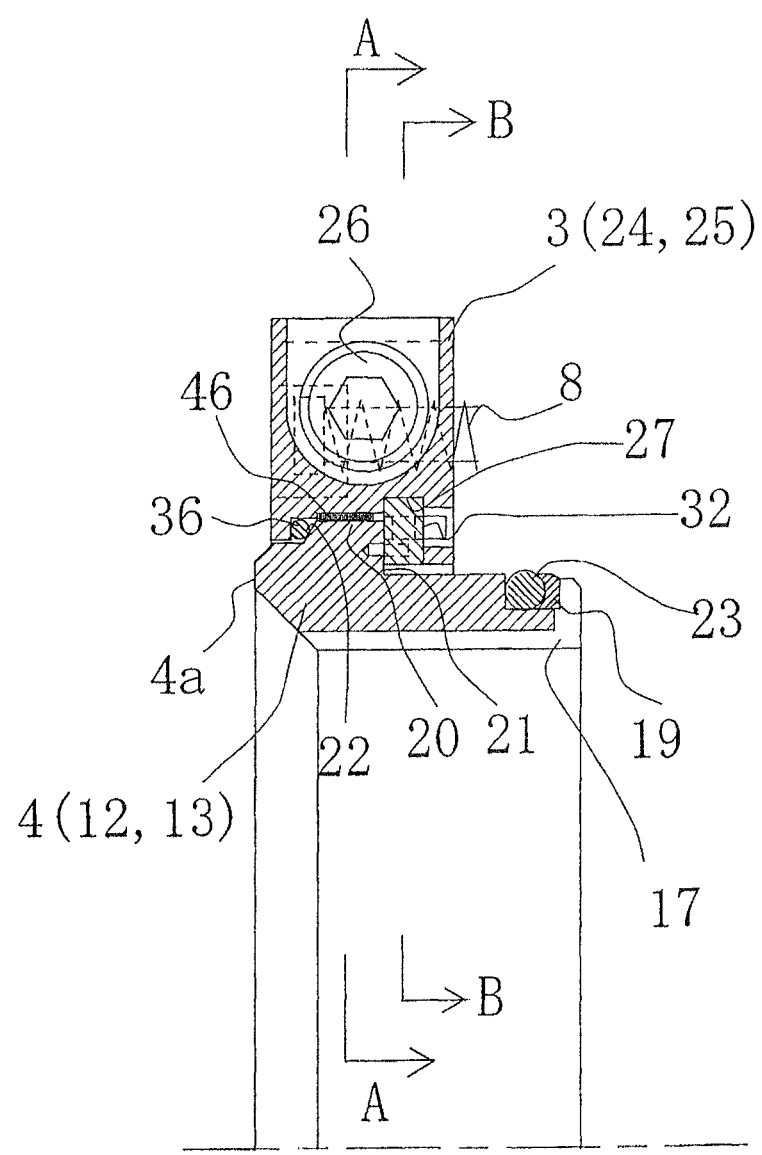
FIG. 2 is an enlarged sectional front view showing a portion of the static seal ring according to the present embodiment.
Figure 3:
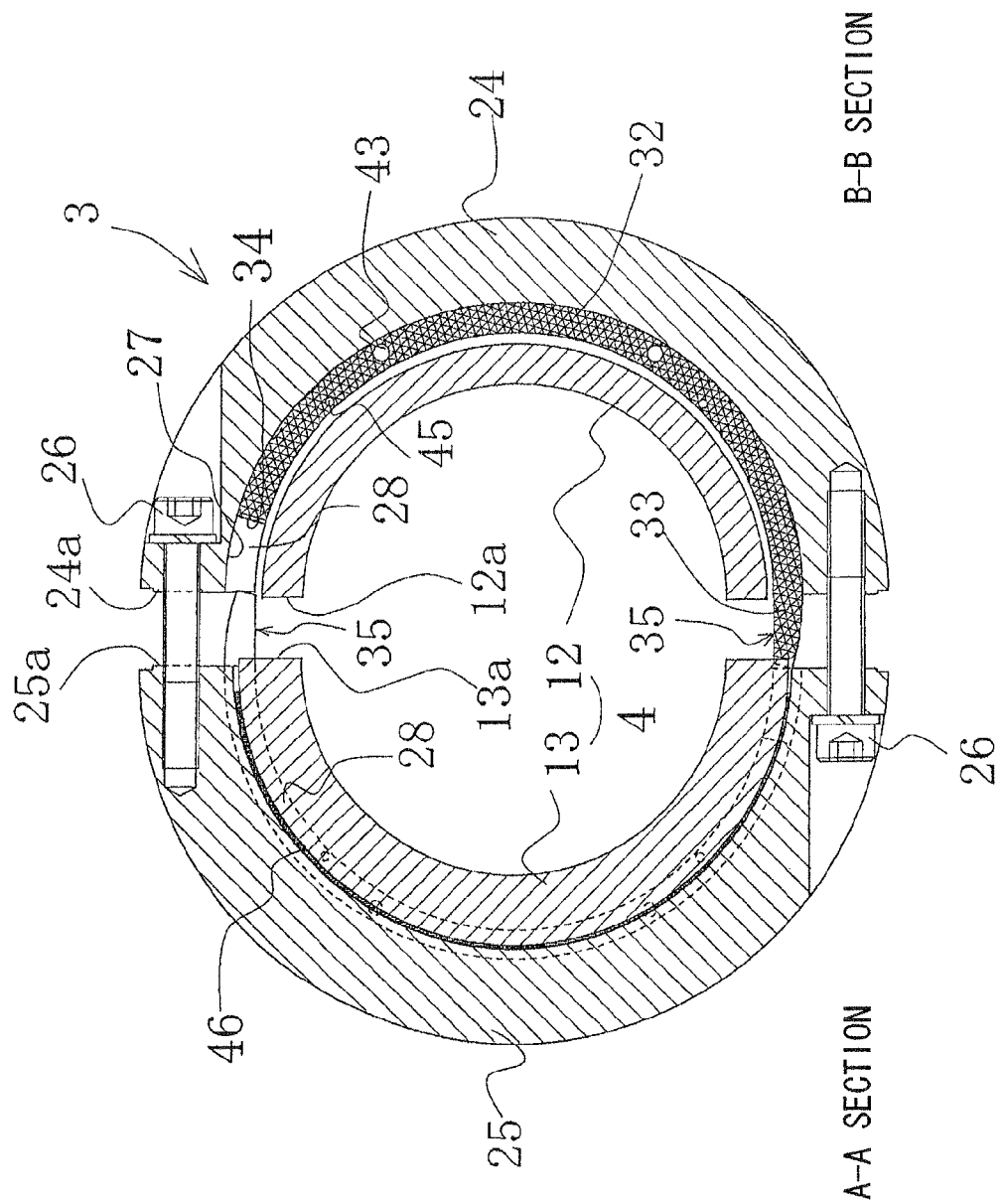
FIG. 3 is a sectional side view along line A-A and line B-B of FIG. 2.
Figure 4:
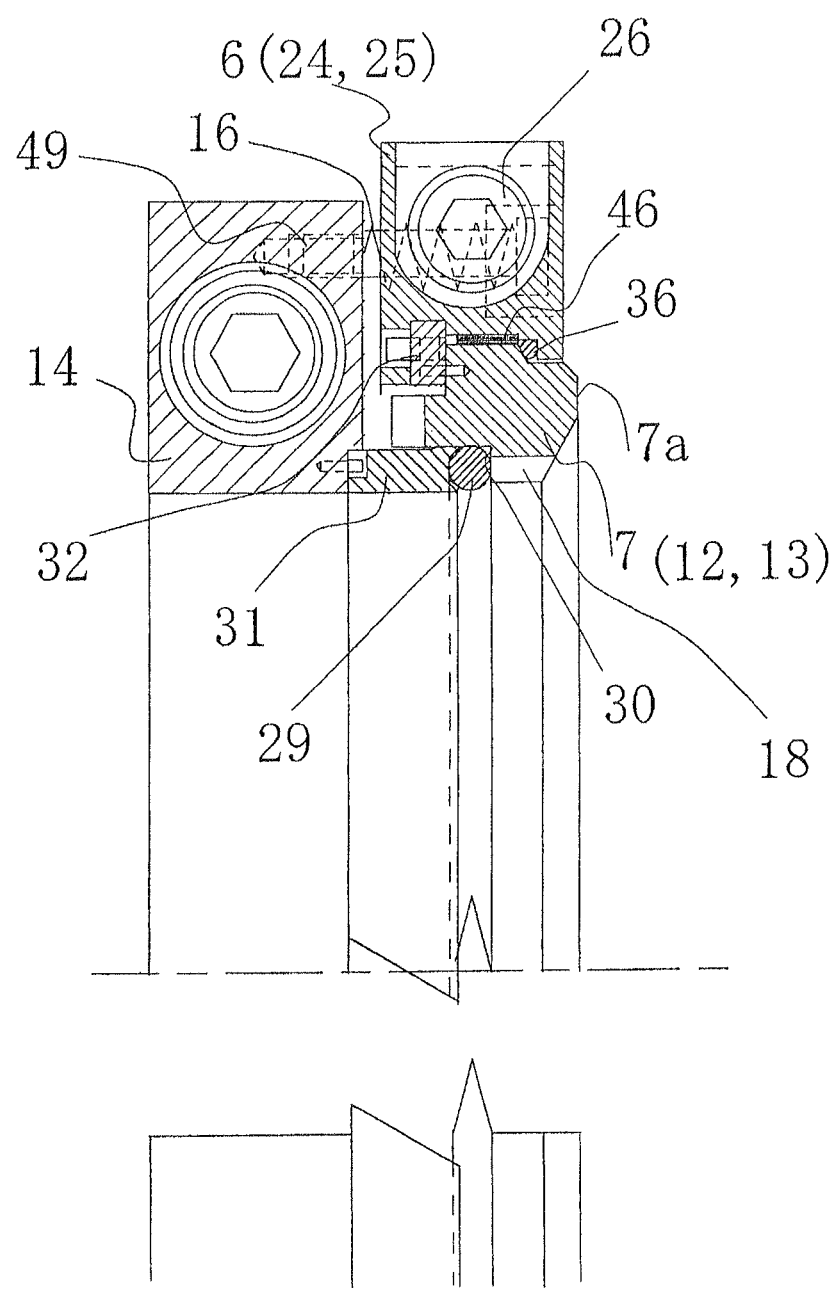
FIG. 4 is an enlarged sectional front view showing a portion of the rotating seal ring according to the present embodiment.

FIG. 1 is a sectional front view showing the entire split mechanical seal according to the present embodiment, and FIG. 2 is an enlarged sectional front view showing a portion of the static seal ring, and FIG. 4 is an enlarged sectional front view showing a portion of the rotating seal ring. FIG. 3 is a sectional side view along line A-A and line B-B of FIG. 2.

As shown in FIG. 1, the split mechanical seal according to an embodiment of the present invention is provided with a seal case 2 attached to a shaft seal part 1a of a rotary shaft insertion portion of a pump or other housing 1; a static seal ring 4 held by the seal case 2 via a split flange 3 so as to be incapable of relative rotation but capable of moving along the axial direction; a rotating seal ring 7 positioned to the left of the static seal ring 4 and fixed to a rotary shaft 5 of a pump or the like via a split flange 6; and a spring 8 for urging the static seal ring 4 to the left so as to press against the rotating seal ring 7, the spring 8 being provided between the seal case 2 and the split flange 3. The split mechanical seal is an outside mechanical seal configured so that a sealed fluid region (region communicated with the inside of the housing 1 of the pump or the like) X that is the internal peripheral region of seal end surfaces 4a, 7a, and a non-sealed fluid region (air region outside the housing 1 of the pump or the like) A that is the external peripheral region of the seal end surfaces 4a, 7a are shielded from each other by the relative rotational sliding of the seal end surfaces 4a, 7a, which are the opposing end surfaces of the seal rings 4, 7.

An outside mechanical seal is described as an example in the present embodiment, but the present invention is not limited to an outside mechanical seal, and may also be applied to another type of mechanical seal, e.g., an inside mechanical seal, as shall be apparent.

As shown in FIG. 1, the seal case 2 forms a torus having an internal peripheral portion larger in diameter than the rotary shaft 5, and is attached by a bolt (not shown) via an O-ring 9 to the shaft seal part 1a of the housing 1 in a state in which the rotary shaft 5 is concentrically inserted.

The static seal ring 4 has the seal end surface 4a at one end thereof, and as shown in FIG. 3, the static seal ring 4 is toric in shape and split in the circumferential direction into a plurality (two in the present example) of split seal rings 12, 13 in an annular state in which the split contact surfaces (end surfaces in the circumferential direction of the circular split bodies 12, 13) 12a, 13a are close to each other, and the static seal ring 4 is held in a fitted state inside the split flange 3, as described hereinafter.

In the same manner as in the static seal ring 4, the rotating seal ring 7 has the seal end surface 7a at one end thereof, and is toric in shape and split in the circumferential direction into a plurality (two in the present example) of circular split seal rings in an annular state in which the split contact surfaces (end surfaces in the circumferential direction of the circular split bodies) are close to each other, and the rotating seal ring 7 is held in a fitted state inside the split flange 6, as described hereinafter.

For convenience of description, the split seal rings constituting the rotating seal ring 7 are sometimes indicated by the reference numerals "7 (12,13)," using the same reference numerals 12 and 13 as are used for the split seal rings constituting the static seal ring 4.

The split flange 6 for fittedly holding the rotating seal ring 7 is fixedly held on the rotary shaft 5 via a retaining ring 14 that is fixed to the rotary shaft 5. Specifically, the retaining ring 14 is split along the circumferential direction thereof and fastened in a ring shape by a fastening bolt 15, and is thereby fitted with and fixed to the rotary shaft 5.

A spring 16 for urging the rotating seal ring 7 to the right so as to press against the static seal ring 4 is provided between the retaining ring 14 and the split flange 6.

The rotating seal ring 7 is composed of silicon carbide or another hard material, and the static seal ring 4 is composed of carbon or the like having self-lubricating properties and more flexibility than the rotating seal ring 7, for example.

The static seal ring 4 and the rotating seal ring 7 are split at two locations in the circumferential direction by forming cutout grooves 17 and 18 along the entire width in the axial direction on the internal peripheral sides of the static seal ring 4 and rotating seal ring 7, respectively, and applying force outward in the radial direction, and split contact surfaces 12a, 13a are formed as the natural fracture surfaces. The split contact surfaces 12a, 13a of the split seal ring 4 (12, 13) on the static side and the split seal ring 7 (12, 13) on the rotating side, respectively, therefore have minute and irregular surface indentations, and when the split contact surfaces 12a, 13a are close to each other, the interlocking of the indentations of the split contact surfaces 12a, 13a prevents the split seal rings 4 (12, 13), 7 (12,13) from being misaligned in the radial and axial directions, and enables the static seal ring 4 and the rotating seal ring 7 to be properly retained in an annular state.

As shown in FIG. 1, the split flange 3 for fittedly holding the static seal ring 4, and the split flange 6 for fittedly holding the rotating seal ring 7 are attached opposite each other with respect to the seal end surfaces 4a, 7a, and have the same structure. The split flange 3 on the static side for fittedly holding the static seal ring 4 will therefore be described as an example hereinafter, and the split flange 6 on the rotating side will be mentioned only when necessary.

The split flange 3 on the static side will be described by describing the cross-sectional shapes of the split seal rings 12, 13 that constitute the static seal ring 4 fittedly held by the split flange 3.

As shown in FIGS. 1 and 2, the cross-sectional shape of the external peripheral side of the split seal ring 4 (12, 13) that constitutes the static seal ring 4 is such that the central portion 20 thereof in the width direction is high, one side thereof has a perpendicular step portion 21, the other side has an inclined step portion 22 forming an obtuse angle, and both sides have a low profile. The low portion having the perpendicular step portion 21 is extended, and formed so that a split O-ring 23 for forming a seal with the seal case 2 is securely retained by a split backup ring 19. FIGS. 1 and 2 (as well as FIGS. 5 and 9) show a state in which the split backup ring 19 is disposed on the side of the sealed fluid region that is the region on the internal peripheral side with respect to the split O-ring 23, and the split O-ring 23 is backed up, but the same effects can be obtained when the split backup ring 19 is disposed on the opposite side from the sealed fluid region, which is the region on the internal peripheral side, with respect to the split O-ring 23, and the split O-ring 23 is backed up.

The sealed end surface 4a described above is formed at the end portion of the low portion having the inclined step portion 22 forming an obtuse angle.

As shown in FIG. 3, the split flange 3 on the static side is an annular body made of stainless steel that is split in the circumferential direction into a plurality (two in the present example) of circular split flanges 24, 25 in an annular state in which the split contact surfaces (end surfaces in the circumferential direction of the circular split flanges 24, 25) 24a, 25a are close to each other, and the split contact surfaces 24a, 25a are connected by fastening bolts 26, 26.

The cross-sectional shape of the internal peripheral side of the split flange 3 (24, 25) on the static side that faces the external peripheral side of the split seal ring 4 (12, 13) on the static side roughly corresponds to the cross-sectional shape of the external peripheral side of the split seal ring 4 (12, 13), and as shown in FIG. 2, a groove 27 rectangular in cross-section is formed along the entire periphery in a position corresponding to the perpendicular step portion 21 of the split seal ring 4 (12, 13), and a fitting hole 28 rectangular in cross-section for fitting a split ring described hereinafter is formed by the perpendicular step portion 21 of the split seal ring 4 (12, 13) and the rectangular groove 27 of the split flange 3 (24, 25).

The internal peripheral side of the split flange 3 (24, 25) that corresponds to the obtusely angled inclined step portion 22 of the split seal ring 4 (12, 13) on the static side is formed at a substantially right angle so as to form a substantially triangular gap as shown in FIG. 2.

For convenience of description, the split flange constituting the split flange 6 for fittedly holding the rotating seal ring 7 is sometimes indicated by the reference numerals "6 (24, 25)," using the same reference numerals 24 and 25 as are used for the split flange 3.

As shown in FIGS. 1 and 4, the cross-sectional shape of the external peripheral side of the rotating seal ring 7 mirrors that of the static seal ring 4, and a groove 30 is provided to the internal peripheral side of the rotating seal ring 7 so as to accommodate a split O-ring 29 for forming a seal with the external peripheral surface of the rotary shaft 5. The rotating seal ring 7, the split O-ring 29, a split backup ring 31, and the retaining ring 14 are stably retained by a drive pin 49 and the spring 16 loaded between the retaining ring 14 and the split flange 6, and the split O-ring 29 is also therefore securely retained in the groove 30 in a state of being pushed in the axial direction by the split backup ring 31.

Circular split rings 32 rectangular in cross-section, made of stainless steel, and having the same length as the circular length of the split ring fitting holes 28, as shown in FIGS. 2 through 4, are fitted into the split ring fitting holes 28 (see FIG. 3) formed by the perpendicular step portions 21 of the split seal rings 4 (12, 13), 7 (12, 13) and the rectangular grooves 27 of the split flanges 3 (24, 25), 6 (24, 25). The split rings 32 are thus fitted into the split ring fitting holes 28 out of phase in the circumferential direction with respect to the split seal rings 4 (12, 13), 7 (12, 13) and the split flanges 3 (24, 25), 6 (24, 25), the distal ends of the split rings 32 protrude a predetermined length from the split contact surfaces 12a, 13a of the split seal rings 4 (12, 13), 7 (12,13) and the split contact surfaces 24a, 25a of the split flanges 3 (24, 25), 6 (24, 25), and rear end portions 34 are recessed into the fitting holes 28 by a distance that corresponds to the length of protruding portions 33, as shown in FIG. 3.

The protruding portions 33 at the distal ends of the split rings 32 are formed in a tapering shape to facilitate fitting into the fitting holes 28. For example, in the present example as shown in FIG. 3, the internal peripheral side 35 of the protruding portion 33 is shaped linearly in the direction tangential to the base portion of the protruding portion 33. Therefore, when the split seal rings 4 (12, 13), 7 (12,13) and the split flanges 3 (24, 25), 6 (24, 25) are placed close to each other at the split contact surfaces, the protruding portions 33 of the split rings 32 easily fit into the corresponding split ring fitting holes 28.

Figure 5:
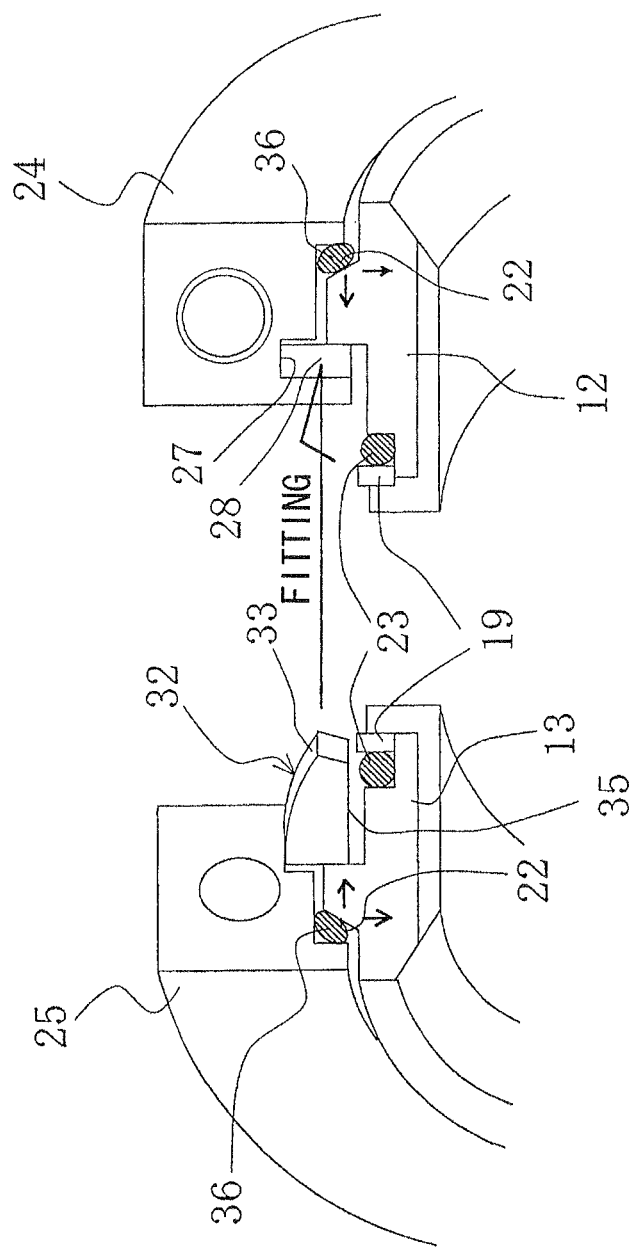
FIG. 5 is a perspective view showing a state in which the split seal ring on the static side and the split flange are placed close together at the split contact surfaces thereof.

FIG. 5 is a perspective view showing a state in which the split seal ring 4 (12, 13) and the split flange 3 (24, 25) are placed close together at the split contact surfaces thereof, and shows the manner in which the protruding portion 33 of the split ring 32 that protrudes from the split contact surface of the split seal ring 13 and split flange 25 on the left fits into the split ring fitting hole 28 of the split seal ring 12 and split flange 24 on the right. In this configuration, since the internal peripheral side 35 of the protruding portion 33 at the distal end of the split ring 32 is shaped linearly in the direction tangential to the base portion of the protruding portion 33, the protruding portion 33 easily fits into the fitting hole 28 even when the two split mechanical seals are somewhat misaligned in the radial direction.

Figure 6:
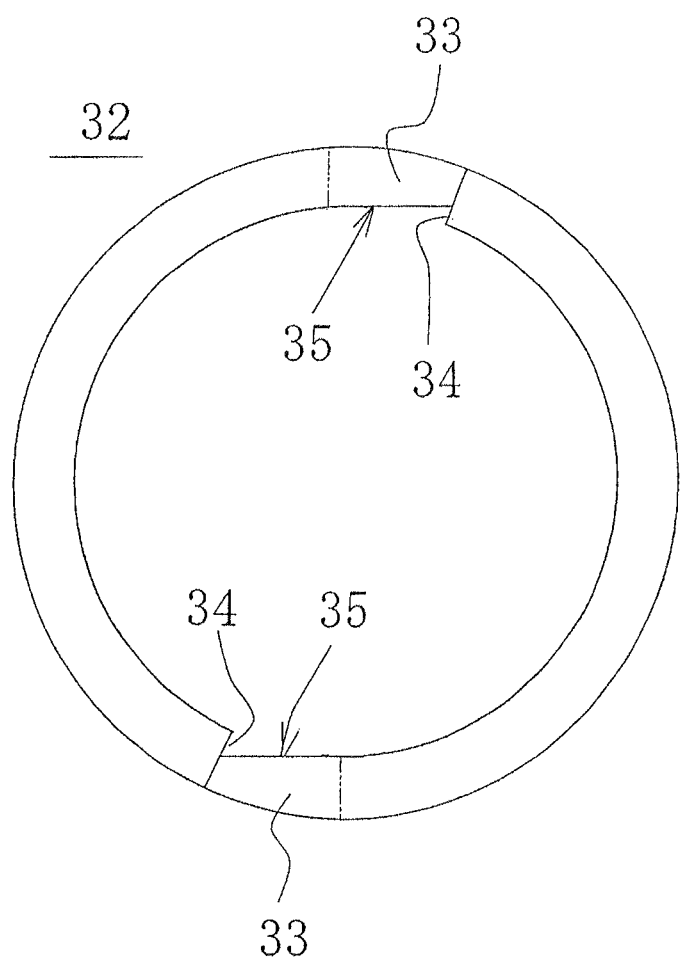
FIG. 6 is a view showing the state of the split ring when the two split mechanical seals are placed close together at the split contact surfaces thereof.

FIG. 6 is a view showing the state of the split ring 32 when the two split mechanical seals are placed close together at the split contact surfaces thereof, wherein the protruding portion 33 at the distal end of the split ring 32 is joined to the rear end portion 34.

As shown in FIG. 5, a cushioning member 36 is installed in the substantially triangular gap formed between the obtusely angled inclined step portion 22 of the split seal ring 4 (12, 13) on the static side and the corresponding internal peripheral side of the split flange 3 (24, 25) on the static side. When the cushioning member 36 is compressed, a counterforce acts in the axial direction and radial direction on the inclined step portion 22 of the split seal ring 4 (12, 13) on the static side.

Figure 7:
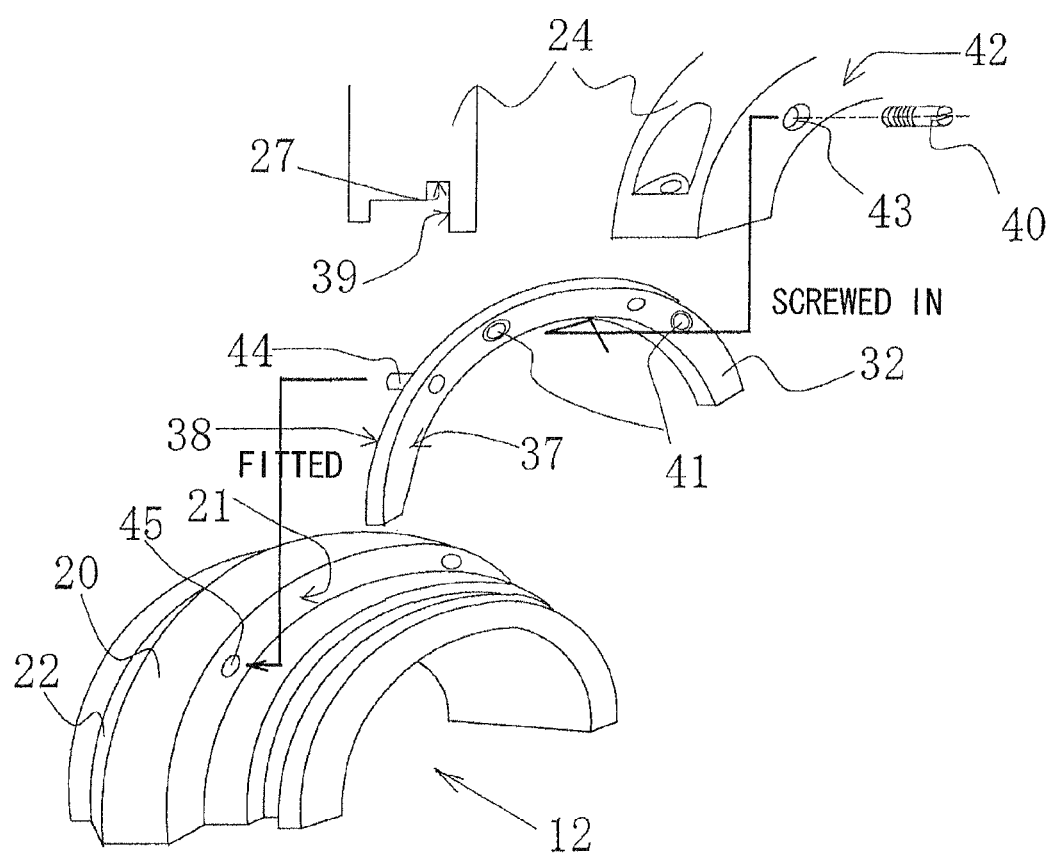
FIG. 7 is a perspective view showing a state in which the split seal ring and the split flange are temporarily fitted with good precision, and assembled with good precision at the split contact surfaces thereof.

FIG. 7 is a perspective view showing the entire assembly precisely assembled when the split seal ring 12 and the split flange 24, for example, are temporarily fitted with good precision, and then joined with the other split seal ring 13 and split flange 25 at the split contact surfaces thereof.

The precision in the axial direction will first be described.

The split flange 24 and the split ring 32 are heat treated for straightening after being turned on a lathe, the right-side surface 39 of the groove 27 of the split flange 24 is turned for precision, and the right-side surface 37 and left-side surface 38 of the split ring 32 are ground for precision. The perpendicular step portion 21 of the split seal ring 12 is also ground for precision.

During temporary fitting, the right-side surface 37 of the split ring 32 is placed against the right-side surface 39 of the groove 27 of the split flange 24, and the left-side surface 38 is placed against the perpendicular step portion 21 of the split seal ring 12. The force in the axial direction by which these components are placed together is the counterforce that accompanies elastic deformation of the cushioning member 36 described above. The positional relationship of the split seal ring 12 and the split flange 24 in the axial direction is therefore the same as designed.

The precision in the radial direction will next be described.

Screw holes 41 into which drive pins 40 are screwed are provided to the right-side surface 37 of the split ring 32, and holes 43 into which the drive pins 40 are fitted are provided to a left-side surface 42 of the split flange 24 so as to correspond to the screw holes 41.

A knock pin 44 is fixed to the left-side surface 38 of the split ring 32, and the knock pin 44 is configured so as to fit into a knock pin fitting hole 45 of the perpendicular step portion 21 of the split seal ring 12. The positional relationship of the split seal ring 12 and the split flange 24 in the radial direction is therefore also substantially the same as designed. Then, when the split seal rings 4 (12, 13), 7 (12,13) are joined at the split contact surfaces thereof, the misalignment of the split seal rings 4 (12, 13), 7 (12,13) in the radial direction is ultimately corrected by the fitting together of the surface indentations of the split contact surfaces 12a, 13a which are the natural fracture surfaces, and the split seal rings 4 (12, 13), 7 (12,13) are held in the proper annular state. Since the precisely assembled split seal ring 12, split flange 24, and split ring 32 thus have a temporary fitting and retaining function, the temporary fitting state is maintained even during transport or the like in the temporarily fitted state.

The drive pins may also be screwed in instead of using the abovementioned knock pin 44.

Figure 8:
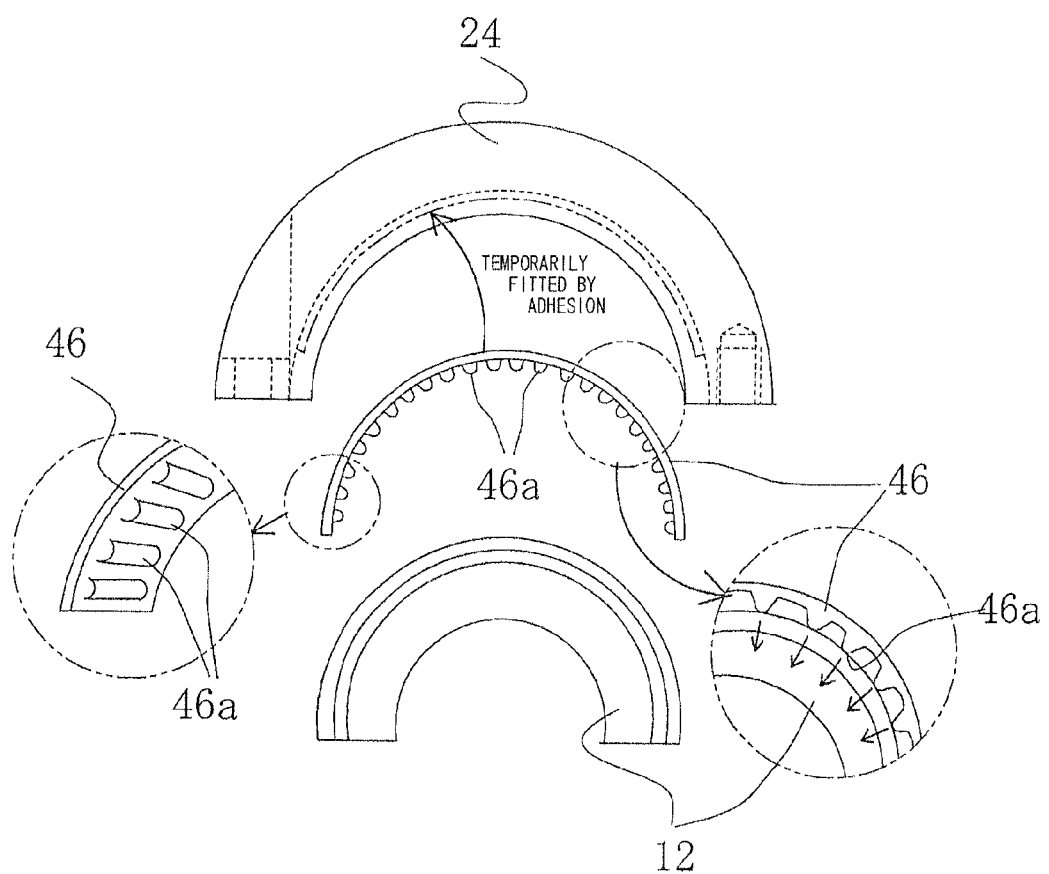
FIG. 8 is a perspective view showing a state in which the split tolerance ring is provided between the internal peripheral surface of the split flange and the external peripheral side of the split seal ring.

FIG. 8 is a perspective view showing a state in which a split tolerance ring 46, for example, formed by press-molding a thin stainless steel strip into a corrugated profile having bulging portions 46a aligned in the longitudinal direction, cutting the molded strip to the appropriate length, and bending the strip into an arc so that the bulging portions 46a are on the inside, is provided between the internal peripheral surface of the split flange 24 and the external peripheral side of the split seal ring 12. As shown in FIGS. 2 and 4, in the present example, the split tolerance ring 46 is provided between the internal peripheral surface of the split flanges 3 (24, 25), 6 (24, 25) and a high surface 20 of the central portion in the width direction of the split seal rings 12, 13 constituting the static seal ring 4 and rotating seal ring 7, and the split tolerance ring 46 is loaded with the bulging portions 46a in a compressed state. The split seal rings 4 (12, 13), 7 (12,13) are concentrically urged toward and held against the internal peripheral surface of the split flanges 3 (24, 25), 6 (24, 25) by the elastic force of the bulging portions 46a in the radial direction. Particularly since an equally distributed inward force in the radial direction is created by the elastic deformation force of each of the bulging portions 46a, the internal pressure resistance can be effectively set, and it is possible to prevent deformation of the split seal rings 4 (12, 13), 7 (12,13) by excessive tightening.

Figure 9:
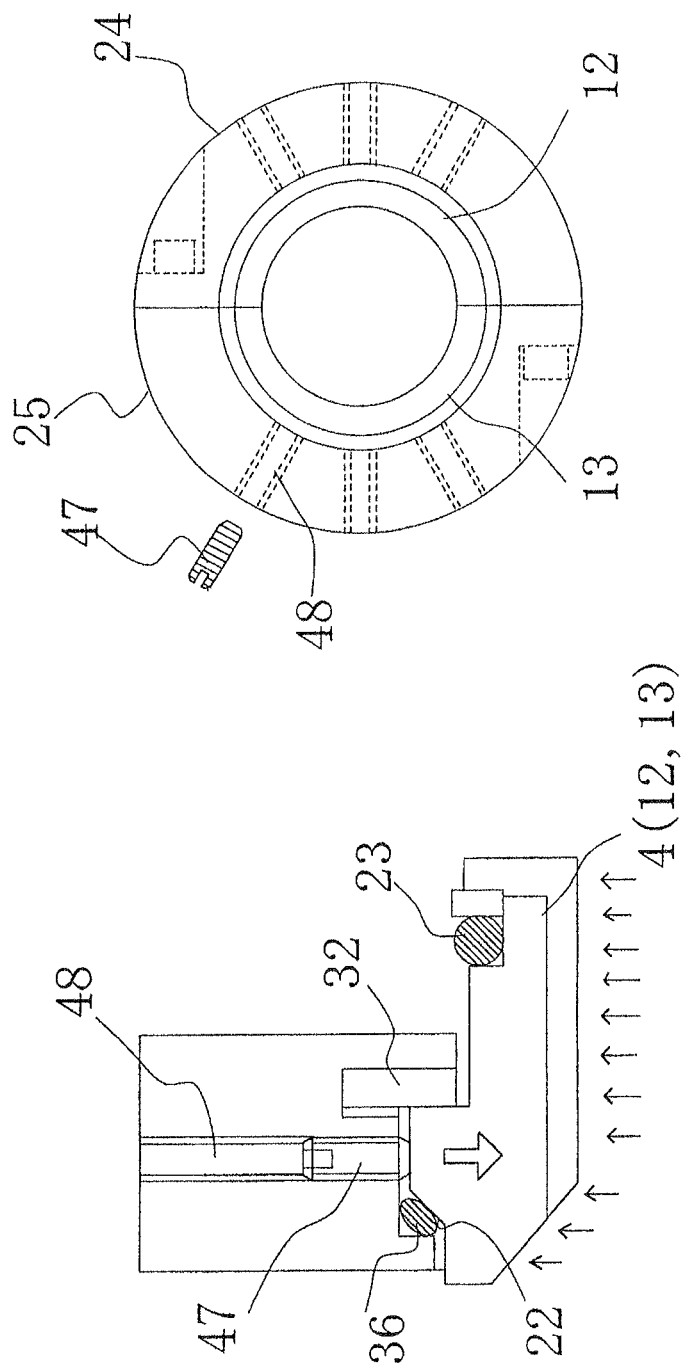
FIG. 9 is a view showing the structure in which set screws are screwed into the screw holes arranged in the circumferential direction of the split flange.
Figure 13:
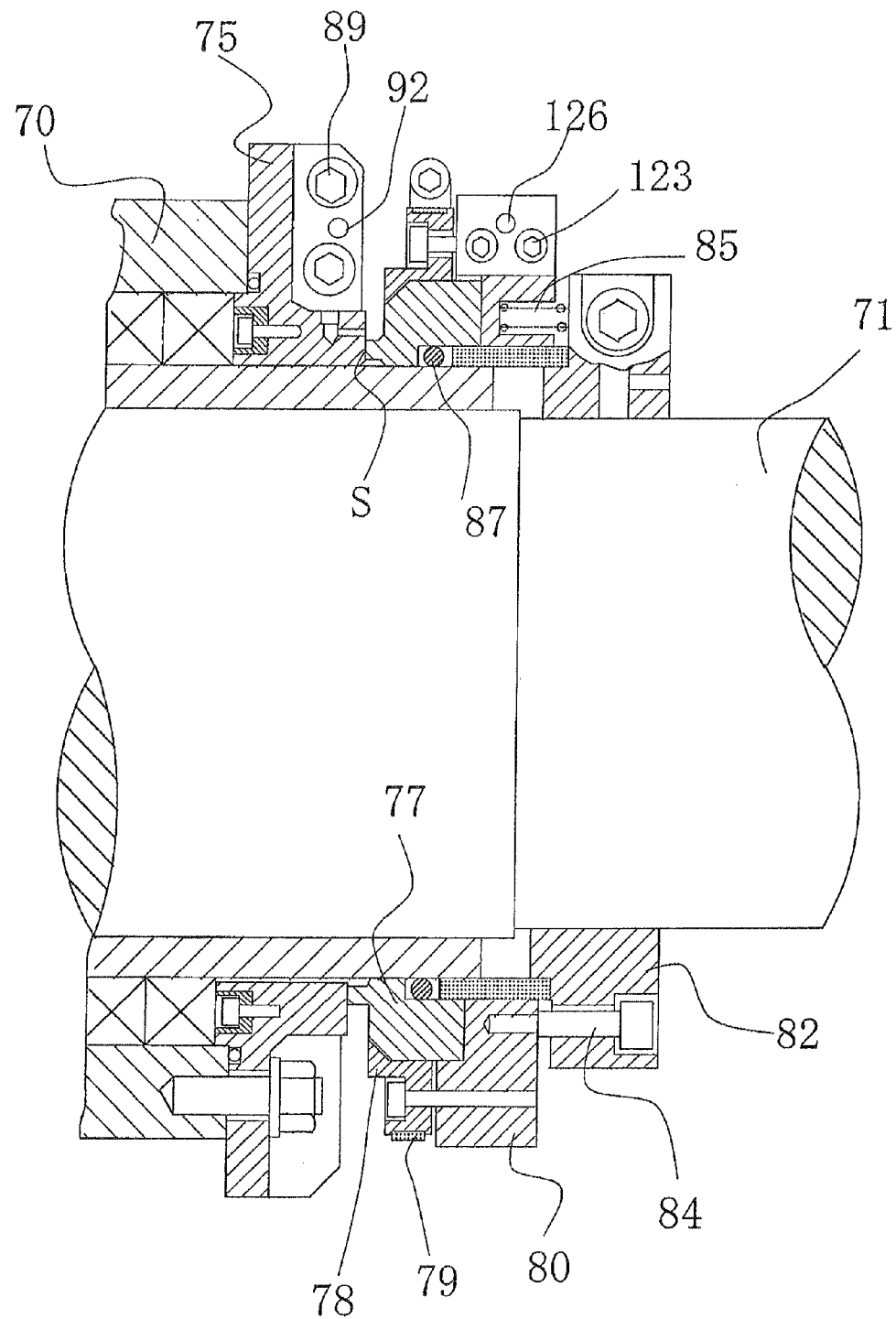
FIG. 13 is a view showing Prior Art 1.
Figure 14:
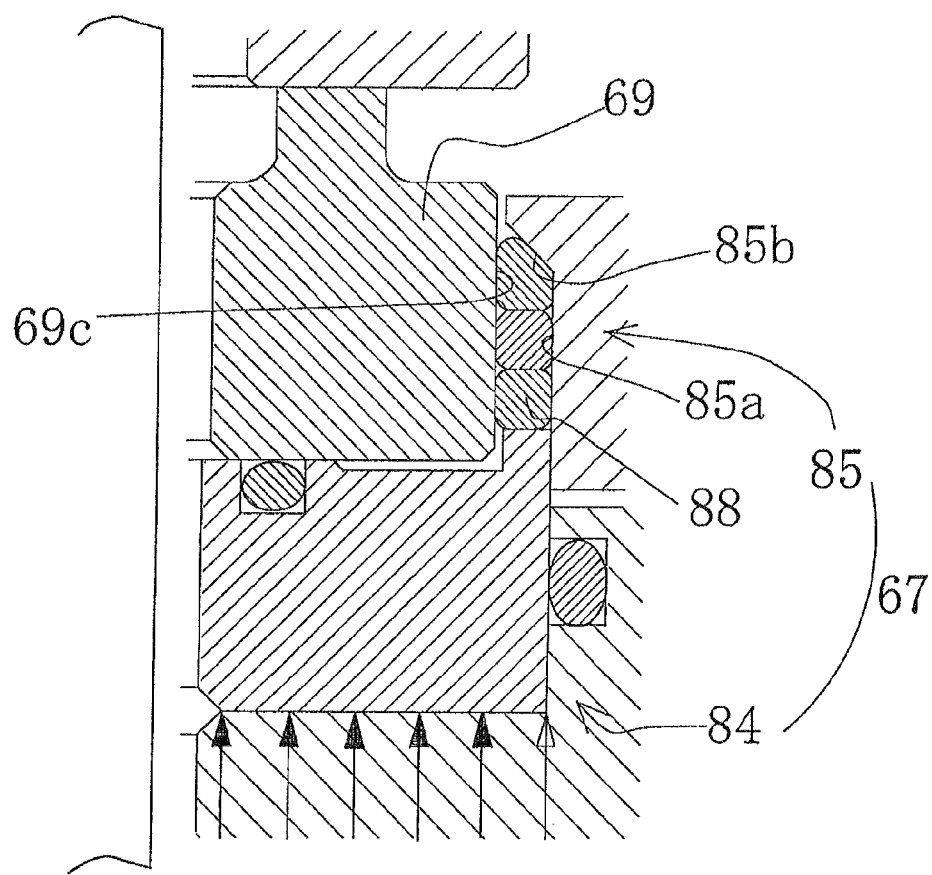
FIG. 14 is a view showing Prior Art 2.

FIG. 9 is a view showing the structure in which screw holes 48 oriented toward the external peripheral surface of the static seal ring 4 (12, 13) are provided in a plurality of locations in the circumferential direction of the split flanges 3 (24, 25), 6 (24, 25), and set screws 47 are screwed into the screw holes 48, wherein FIG. 9(a) is a sectional front view showing the relevant portion, and FIG. 9(b) is a side view. In the present example, the distal ends of the set screws 47 make contact with the external peripheral surface of the split seal ring 4 (12, 13) and push the split seal ring 4 (12, 13) toward the center.

Therefore, during assembly at a site after temporary fitting and transport, the internal pressure resistance to the fluid pressure acting on the split seal rings 4 (12, 13), 7 (12,13) can be set by tightening the set screws 47 from the outside diameter side of the split flanges 3 (24, 25), 6 (24, 25) at a controlled torque. Adjustments to changes over time can also be made by retorquing.

FIG. 10 is a view showing the state in which the split O-ring 23 for forming a seal against the seal case 2 is loaded on the external peripheral surface of the split seal ring 4 (12, 13) on the static side, wherein FIG. 10(a) is a sectional front view showing the relevant portion, and FIG. 10(b) is a view showing the split surface of the O-ring.

FIG. 11 is a view showing the state in which the split O-ring 29 for forming a seal against the external peripheral surface of the rotary shaft 5 is loaded on the internal peripheral surface of the split seal ring 7 (12, 13) on the rotating side, wherein FIG. 11(a) is a sectional front view showing the relevant portion according to an embodiment of the present invention, and FIG. 11(b) is a sectional front view showing an example of the prior art.

In an embodiment of the present invention, the split O-ring 23 loaded on the external peripheral surface of the split seal ring 4 (12, 13) on the static side is securely retained by the split backup ring 19, and likewise, the split O-ring 29 loaded on the internal peripheral surface of the split seal ring 7 (12, 13) on the rotating side is also securely retained by the split backup ring 31.

When the conventional split backup ring shown in FIG. 11(b) is used, the O-ring deforms when fluid pressure acts on the O-ring, and the O-ring escapes into a gap 50. The split faces 51 of the O-ring shown in FIG. 10(b) then separate, and leakage occurs.

Therefore, in an embodiment of the present invention, the split backup rings 19 and 31 are provided with a cross-sectional shape in which lip portions 52, 52 for preventing escape of the O-ring are provided on the inside and outside radial sides adjacent to the split O-rings 23 and 29, and the split backup rings 19 and 31 are formed so as to cover the split O-rings 23 and 29, as shown in FIGS. 10(a) and 11(a). The cut faces 51 of the split O-rings 23 and 29 are therefore pushed together, and leakage from the cut faces can be prevented. The ratio to which the O-ring fills the gap between the sliding portions can also be increased to prevent leakage. Furthermore, during temporary fitting, the lip portions 52, 52 of the split backup rings 19 and 31 also encroach into the gaps between the split seal rings 4 (12, 13), 7 (12,13) and the split O-rings 23 and 29, thereby enabling the members to catch on each other and be fixed in place, creating the temporary fitting function.

In the prior art example shown in FIG. 11(b), since the split O-ring 29 is designed with a large tightening margin in the circumferential direction, when the two split mechanical seals are joined in assembly with the rotary shaft 5, a counterforce is created by frictional resistance between the tightening margin portion of the split O-ring 29 and the external peripheral surface of the rotary shaft 5, the split O-ring 29 escapes, and a gap is created between the joint surfaces of the split O-ring 29.

In an embodiment of the present invention, since the split O-ring 29 can be designed with a small tightening margin in the circumferential direction, it is possible to prevent a gap from being formed by escape of the tightening margin portion of the split O-ring 29 when the split mechanical seal is joined in assembly.

FIG. 12 is a view showing the cut shape of the split contact surface formed by the split O-ring 29 for forming a seal against the external peripheral surface of the rotary shaft 5, the split O-ring 29 being loaded on the internal peripheral surface of the split seal ring 7 (12, 13) on the rotating side, and the split backup ring 31 for backing up the split O-ring 29, wherein FIGS. 12(a) and 12(b) are sectional front views showing the relevant portions according to an embodiment of the present invention, and FIG. 12(c) is a sectional front view showing an example of the prior art.

In the prior art example shown in FIG. 12(c), the cut shape of the split contact surfaces of the split O-ring 29 and the split backup ring 31 is formed so that surfaces inclined in the same direction are formed. The distal end 53 of the cut portion of the O-ring is bitten between the other members, causing a gap to be formed.

Therefore, in an embodiment of the present invention, the split contact surfaces of the split O-ring 29 for forming a seal against the external peripheral surface of the rotary shaft 5, the split O-ring 29 being loaded on the internal peripheral surface of the split seal ring 7 (12, 13) on the rotating side, and the split backup ring 31 for backing up the split O-ring 29 are formed so that one of the split contact surfaces forms a protruding convex portion 54, and the other split contact surface forms a concave portion 55 into which the convex portion fits, as shown in FIG. 12(a). Alternatively, one split contact surface of the split O-ring 29 is formed as a protruding convex portion 54, and the other split contact surface is formed as a concave portion 55 into which the convex portion fits, as shown in FIG. 12(b). Therefore, when the split flange 6 (24, 25) on the rotating side and the split seal ring 7 (12, 13) on the rotating side are joined in assembly with the rotary shaft 5, the split O-ring 29 can be prevented from being bitten between other members.

The same effects are obtained for the split backup ring 19 and the split O-ring 23 for forming a seal against the seal case 2, the split O-ring 23 being loaded on the external peripheral surface of the split seal ring 4 (12, 13) on the static side.

The invention claimed is:

1. A split mechanical seal comprising split seal rings in which a static seal ring provided on the side of a housing, or a rotating seal ring provided to a rotary shaft inserted through a housing, is split along the circumferential direction; and split flanges in which split contact surfaces of the split seal rings are placed together, the split flanges being fitted on external peripheral surfaces of the split seal rings; the split mechanical seal being configured so that a seal is formed by seal end surfaces that are the opposing end surfaces of the static seal ring and the rotating seal ring; said split mechanical seal characterized in that split ring fitting holes into which split rings having a rectangular cross-section are fitted are formed along the entire length in the circumferential direction between the split seal rings and the split flanges;

the split rings rectangular in cross-section are provided in the split ring fitting holes with the phases of the split seal rings and the split flanges shifted from each other in the circumferential direction such that one end of each split ring protrudes from the split contact surface; and protruding portions of the split seal rings fit into corresponding split ring fitting holes when the split seal rings and the split flanges are placed together at the split contact surfaces.

2. The split mechanical seal according to claim 1, characterized in that the split contact surfaces of the split seal rings are natural fracture surfaces.

3. The split mechanical seal according to claim 1, characterized in that the protruding portions of the split rings are tapered.

4. The split mechanical seal according to claim 1, characterized in that the cross-sectional shape of the external peripheral sides of the split seal rings is such that the central portion of the cross-sectional shape in the width direction is high, one side thereof has a perpendicular step portion, the other side has an inclined step portion forming an obtuse angle, and both sides have a low profile;

the cross-sectional shape of the internal peripheral sides of the split flanges that face the external peripheral sides of the split seal rings substantially corresponds to the cross-sectional shape of the external peripheral sides of the split seal rings;

a groove rectangular in cross-section is formed in a position corresponding to the perpendicular step portion of each split seal ring on the internal peripheral side of the split flanges; and the split ring fitting holes are formed by the perpendicular step portion of each split seal ring and the groove of each split flange.

5. The split mechanical seal according to claim 1, characterized in that a cushioning member is provided between the internal peripheral side of each split flange and the obtusely angled inclined step portion on the external peripheral side of each split seal ring.

6. The split mechanical seal according to claim 1, characterized in that the precision of positioning in the axial direction is enhanced by joining one side surface of each split ring with the perpendicular step portion of each split seal ring, and joining the other side of the split ring with an inside surface of the groove of each split flange.

7. The split mechanical seal according to claim 1, characterized in that a plurality of screw holes for screwing drive pins that are screwed in from drive pin fitting holes of each split flange is provided to one side surface of each split ring; and a plurality of knock pins for fitting in or drive pins for screwing into the perpendicular step portion of each split seal ring is loaded on the other side surface of each split ring.

8. The split mechanical seal according to claim 1, characterized in that a split tolerance ring is provided between the external peripheral surface of each split seal ring and the internal peripheral surface of each split flange.

9. The split mechanical seal according to claim 1, characterized in that screw holes oriented toward the external peripheral surface of each split seal ring are provided in a plurality of locations in the circumferential direction of each split flange; and set screws are screwed into the screw holes.

10. The split mechanical seal according to claim 1, characterized in that the cross-sectional shape of a split backup ring for backing up a split O-ring loaded on the external peripheral surface of each split seal ring on the static side to form a seal against a seal case, or a split O-ring loaded on the internal peripheral surface of each split seal ring on the rotating side to form a seal against the external peripheral surface of the rotary shaft is formed having lip portions on the inside and outside radial sides adjacent to the split O-ring, so as to cover the split O-ring.

11. The split mechanical seal according to claim 1, characterized in that the split contact surfaces of the split O-ring loaded on the external peripheral surface of each split seal ring on the static side to form a seal against a seal case, or a split O-ring loaded on the internal peripheral surface of each split seal ring on the rotating side to form a seal against the external peripheral surface of the rotary shaft, and the split backup ring for backing up the split O-ring are formed so that one of the split contact surfaces forms a protruding convex portion, and the other split contact surface forms a concave portion into which the convex portion fits, or one of the split contact surfaces of the split O-ring forms a protruding convex portion, and the other split contact surface forms a concave portion into which the convex portion fits.

12. The split mechanical seal according to claim 2, characterized in that the protruding portions of the split rings are tapered.

13. The split mechanical seal according to claim 2, characterized in that the cross-sectional shape of the external peripheral sides of the split seal rings is such that the central portion of the cross-sectional shape in the width direction is high, one side thereof has a perpendicular step portion, the other side has an inclined step portion forming an obtuse angle, and both sides have a low profile;

the cross-sectional shape of the internal peripheral sides of the split flanges that face the external peripheral sides of the split seal rings substantially corresponds to the cross-sectional shape of the external peripheral sides of the split seal rings;

a groove rectangular in cross-section is formed in a position corresponding to the perpendicular step portion of each split seal ring on the internal peripheral side of the split flanges; and the split ring fitting holes are formed by the perpendicular step portion of each split seal ring and the groove of each split flange.

14. The split mechanical seal according to claim 2, characterized in that a cushioning member is provided between the internal peripheral side of each split flange and the obtusely angled inclined step portion on the external peripheral side of each split seal ring.

15. The split mechanical seal according to claim 2, characterized in that the precision of positioning in the axial direction is enhanced by joining one side surface of each split ring with the perpendicular step portion of each split seal ring, and joining the other side of the split ring with an inside surface of the groove of each split flange.

16. The split mechanical seal according to claim 2, characterized in that a plurality of screw holes for screwing drive pins that are screwed in from drive pin fitting holes of each split flange is provided to one side surface of each split ring; and a plurality of knock pins for fitting in or drive pins for screwing into the perpendicular step portion of each split seal ring is loaded on the other side surface of each split ring.

17. The split mechanical seal according to claim 2, characterized in that a split tolerance ring is provided between the external peripheral surface of each split seal ring and the internal peripheral surface of each split flange.

18. The split mechanical seal according to claim 2, characterized in that screw holes oriented toward the external peripheral surface of each split seal ring are provided in a plurality of locations in the circumferential direction of each split flange; and set screws are screwed into the screw holes.

19. The split mechanical seal according to claim 2, characterized in that the cross-sectional shape of a split backup ring for backing up a split O-ring loaded on the external peripheral surface of each split seal ring on the static side to form a seal against a seal case, or a split O-ring loaded on the internal peripheral surface of each split seal ring on the rotating side to form a seal against the external peripheral surface of the rotary shaft is formed having lip portions on the inside and outside radial sides adjacent to the split O-ring, so as to cover the split O-ring.

20. The split mechanical seal according to claim 2, characterized in that the split contact surfaces of the split O-ring loaded on the external peripheral surface of each split seal ring on the static side to form a seal against a seal case, or a split O-ring loaded on the internal peripheral surface of each split seal ring on the rotating side to form a seal against the external peripheral surface of the rotary shaft, and the split backup ring for backing up the split O-ring are formed so that one of the split contact surfaces forms a protruding convex portion, and the other split contact surface forms a concave portion into which the convex portion fits, or one of the split contact surfaces of the split O-ring forms a protruding convex portion, and the other split contact surface forms a concave portion into which the convex portion fits.

* * * * *